Figure 1:
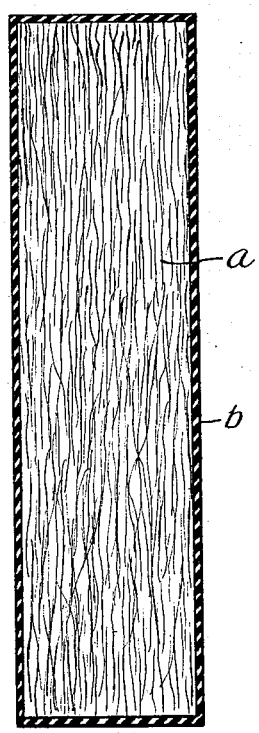

Sept. 1, 1931.   A. C. FISCHER   1,821,885
PACKAGING SEALING MEANS FOR CONSTRUCTIONAL MATERIAL
Filed March 19, 1928

Albert C. Fischer
Inventor:

Patented Sept. 1, 1931

1,821,885

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

PACKAGING SEALING MEANS FOR CONSTRUCTIONAL MATERIAL

Application filed March 19, 1928. Serial No. 262,782.

This case is a continuation-in-part of my application Serial No. 75,152 which matured with Patent No. 1,770,357 on July 8, 1930, and relates particularly to novel and improved constructional material and a method of fabricating same into units.

This invention relates to constructional material surfaced with a rubber film in order to make same waterproof and air tight, acting as a packaging sealing means, preserving the body of the joint and preventing adhesion to other constructional material when crated.

My invention is typified by a composition board-like strip which is employed in paving construction for separating more rigid elements and is generally termed in the art as expansion joint. However, it is suitable for various uses in paving construction, such as, bridge flooring, waterproof protection course for paving blocks, and the like.

Inasmuch as light and air affect bituminous materials it is a desirable feature to coat the expansion joint surface with a material which will prevent access of air or light to the bituminous material. In preventing ingress of light and air into the outside pores of the constructional material the life of the material will be preserved.

Likewise constructional materials are formed out of fibrous materials matted, and my purpose would be to surface saturate or coat such fibrous matted sheets with the same rubber coating material which consists primarily of uncoagulated latex. This material is furnished in uncoagulated state and contains about two (2) per cent ammonia, thirty-three (33) per cent rubber and approximately sixty-five (65) per cent water. The sheets may be immersed in this uncoagulated latex and this mixture, or the mixture may be applied to the surface of the sheets by spraying. This can be accomplished with any suitable rigging for paint sprayers, which are known to the market. The moisture will evaporate, leaving a rubber film upon the surface and filling the pores of the fibrous matted material, or the expansion joint, as described.

It is readily understood that where the fibrous material is not saturated with bituminous material the statement relative to air and light would not apply, but it would make the fibrous matted material waterproof.

Uncoagulated latex, as described, can readily be purchased on the market, and is shipped in this state.

Likewise the surface may be treated with a sulphur dust, should it be desirable to vulcanize the surface film, or any other suitable vulcanizing agent may be used, which would impart some of its properties to the latex when placed upon the surface, and by heating the same a vulcanizing film will prevail. However, it is not essential, as it is a very thin film.

Referring now to the drawings. Figure 1 represents a rectangularly shaped structure, in which $a$ represents the fibrous, matted material, either waterproofed or not as may be desired, and $b$ represents the film coating of rubber.

Figure 2:
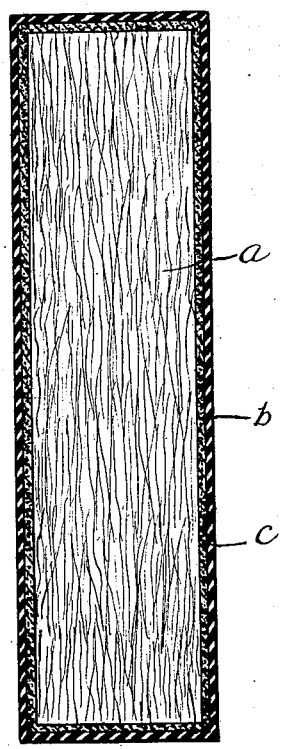

Figure 2 represents another rectangularly shaped structure, in which $a$ represents the fibrous, matted material, either waterproofed or not as desired, $b$ represents the outer rubber film coating, and $c$ represents the coating immediately adjacent to the fibrous matted material, consisting of bituminous material.

Another object of my invention is to prepare a constructional material with a bituminous material, the sides of which are produced without dusting material or interfering surfaces, and placing directly over this bituminous surface of the constructional material a film of uncoagulated latex, thus closing all the pores and shutting out the light and air. Constructional materials are often prepared in a heated state, and where this is done the evaporation of course will be faster than where this does not occur.

The latex film will be particularly advantageous in preventing adhesion of the constructional material, in shutting out the air and light, and in closing the pores, thus making the absorption properties of the joint practically zero.

Fibrous matted materials may be procured on the market in various shapes and forms, and insulating materials which are matted may be employed for this purpose when utilized for constructional material, but it has always been found more practical to utilize bituminous mixtures with fibrous matter, because of the better resistance to strains and pressures.

The material produced by this treatment is waterproof, light and air proof and the surface may be coated with a dusting material if preferred, in which case the dusting material would either be applied first to the surface of the strips and then coated with latex, or the material would be coated with latex first and then have dusting material placed thereover. This would not be necessary in the case of fibrous matted material utilized for the purpose of constructional material. This fibrous matted material may be dried vegetable fiber, matted substance compressed, or any one of the numerous insulation materials which are found on the market, which will subject themselves to this treatment.

As it is not new to manufacture premoulded constructional material I am leaving to the art, as disclosed in the United States Patent Office over a long period of years, the various structures, as I believe there is invention and utility in a light, air and moisture proof film coating of latex.

I claim:

1. The method of coating constructional paving material by immersing in liquid bituminous material, and after said bituminous material has set immersing same in a bath of dissolved rubber, withdrawing same and allowing said film to dry upon the surface.

2. The method of coating bituminous constructional paving material by immersing said bituminous exposed surface in uncoagulated latex, as described, withdrawing said preformed constructional material and allowing the film to dry upon the surface.

3. The method of treating a preformed constructional paving material, having its bituminous surface dusted, by immersing same in said dusted condition in uncoagulated latex, withdrawing said strip and allowing the film to dry upon the surface.

4. The method of treating a preformed constructional paving material by immersing the preformed exposed bituminous surface in uncoagulated latex, withdrawing same and coating over said film thus formed on the surface suitable dusting material.

5. The method of making constructional paving strips characterized by forming a core, waterproofing the core with a bituminous layer, and covering the bituminous layer with a rubber jacket.

6. The method of making expansion joint strips characterized by forming a core, waterproofing the core with a bituminous layer, and covering the bituminous layer with a rubber jacket.

7. A paving constructional unit comprising a compressible elastic fibrous core, a waterproofing coating applied to the core of unitary structure, and a layer covering the waterproofing coating to protect said coating from exposure to the weather.

8. A paving constructional unit comprising a fibrous core, a bituminous coating applied to the core, and a protective rubber layer covering the waterproofing coating.

9. An expansion joint strip comprising a compressible elastic fibrous core, a waterproofing coating applied to the core of unitary structure, and a layer covering the waterproofing coating to protect said coating from exposure to the weather.

10. An expansion joint strip comprising a fibrous core, a bituminous coating applied to the core, and a protective rubber layer covering the waterproofing coating.

Signed at Chicago, Illinois, this 17th day of March, 1928.

ALBERT C. FISCHER.